Nov. 9, 1965    H. J. ANDERSON    3,217,136
PORTABLE WELDING APPARATUS
Filed Jan. 28, 1963    2 Sheets-Sheet 1

INVENTOR
Hubert J. Anderson
By Hooper Leonard & Buell
his attorneys

Nov. 9, 1965 H. J. ANDERSON 3,217,136
PORTABLE WELDING APPARATUS
Filed Jan. 28, 1963 2 Sheets-Sheet 2

INVENTOR
Hubert J. Anderson
his Attorneys

United States Patent Office 3,217,136
Patented Nov. 9, 1965

3,217,136
PORTABLE WELDING APPARATUS
Hubert J. Anderson, Pewaukee, Wis., assignor to Automatic Welding Company, Waukesha, Wis., a corporation of Wisconsin
Filed Jan. 28, 1963, Ser. No. 254,381
14 Claims. (Cl. 219—130)

This invention relates to a portable welding apparatus and particularly to a portable semi-automatic welding apparatus having unprecedented flexibility and adaptability of use yet which is of simple and inexpensive design and construction.

By "semi-automatic" I mean a welding apparatus in which a consumable welding wire or electrode is mechanically fed to the welding nozzle while the nozzle is manipulated, i.e., held in the welder's hand and traversed over the work by the welder himself rather than by mechanical means as in a so-called "automatic" welder.

Many welding jobs are of such character that they can most efficiently and economically be performed by hand welding yet they are of such size that it is desirable to use a mechanically fed consumable electrode or welding wire. I have designed a portable welding apparatus or unit which is ideally suited to such jobs and which has flexibility of mounting and use not possessed by prior portable welding units. The mounting structure or casing of the unit which contains the wire feed means (hereinafter called the "wire feed unit") is preferably provided with a handle adapting it to be carried suspended from the handle. It is adapted by a simple adjustment to feed the welding wire either generally horizontally or generally vertically. Novel means for mounting the wire feed unit are provided, which means are unprecedentedly simple and economical in design yet effectively serve their purpose. The wire feed unit of the portable welding apparatus may be mounted on a stationary base, on a wheeled carrier or even on a welding wire receptacle.

I provide a portable welding apparatus comprising a mounting structure having a handle adapting it to be carried suspended from the handle, first means defining a generally horizontal welding wire path through the mounting structure, second means defining a generally vertical welding wire path through the mounting structure, wire feed means and mounting means for mounting the wire feed means in the mounting structure selectively in position to feed wire in the generally horizontal path defined by said first means and in position to feed wire in the generally vertical path defined by said second means. Preferably the generally horizontal and generally vertical wire paths intersect and the wire feed means are disposed in the plane defined by such intersecting paths in both of said positions. Desirably the mounting means mounting the wire feed means in the mounting structure engage the same portions of the mounting structure in both positions of the wire feed means. The wire feed means and the mounting means may have cooperating mounting portions which register with each other in both positions of the wire feed means. The mounting portions may be holes receiving mounting means such as bolts. The holes are desirably arranged as the apices of a plane figure having all sides equal and all included angles equal; I prefer to arrange the holes in a square. The mounting structure preferably comprises a casing having a first pair of opposed openings in the sides of the casing through which welding wire is adapted to pass (into the casing at one side and out at the opposite side) and a second pair of opposed openings in the top and bottom of the casing through which welding wire is adapted similarly to pass. The wire feed means are mounted in the casing selectively in position to feed wire passing through the first pair of opposed openings and in position to feed wire passing through the second pair of opposed openings.

I further provide a portable welding apparatus comprising a base, a mounting structure having wire feed means therein, the mounting structure being disposed on the base, the base having holddown means, the mounting structure having at one side an opening receiving the holddown means whereby to hold down to the base that side of the mounting structure, and means at the opposite side of the mounting structure fastening such opposite side of the mounting structure to the base whereby to connect the mounting structure to the base. The base preferably has one or more holddown fingers extending upwardly and laterally therefrom and in such case the mounting structure has at one side as many openings as there are fingers receiving the laterally projecting portions of the holddown fingers whereby to hold down to the base that side of the mounting structure. Preferably removable means are provided at the opposite side of the mounting structure fastening such opposite side of the mounting structure to the base whereby to connect the mounting structure to the base. The removable means may comprise bolts with nuts applied thereto to hold in place clips or brackets bearing against the mounting structure.

I further provide a portable welding apparatus comprising a receptacle for welding wire, the receptacle having a rim, a mounting structure mounted on the rim of the receptacle and wire feed means in the mounting structure to feed toward a welding zone wire from the receptacle. Means are preferably provided supporting the mounting structure in position to feed toward a welding zone wire from the receptacle, the supporting means being mounted at least in part on the receptacle. The mounting structure may have wire feed means therein disposed to feed wire in an upward direction and means may be provided supporting the mounting structure in position generally above the receptacle to feed wire from the receptacle upwardly toward a welding zone. The supporting means may be mounted at least in part on the receptacle. In certain cases it is desirable to mount the supporting means entirely on the receptacle. In other cases the supporting means are to advantage mounted in part on the receptacle and in part independently of the receptacle.

The mounting structure may have the wire feed means therein disposed to feed wire in a generally horizontal direction and means may be provided supporting the mounting structure in position generally above but laterally of the center of the receptacle to feed wire from the receptacle generally horizontally toward a welding zone, the supporting means in this case normally being mounted in part on the receptacle and in part independently of the receptacle. Guide means are preferably provided through which the wire passes between the receptacle and the wire feed means disposed to feed wire generally horizontally for receiving the wire moving in a generally upward direction out of the receptacle and guiding it toward the wire feed means. The guide means may be a hollow flexible spring carried by the supporting means.

The supporting means supporting the mounting structure may comprise tubular leg portions slotted at the bottom to embrace a portion of the rim of the welding wire receptacle. Set screws may be provided which may be threaded through the slotted portions of the supporting means to tightly fasten the supporting means to the receptacle.

Other details, objects and advantages of the invention will become apparent as the following description of certain present preferred embodiments thereof proceeds.

In the accompanying drawings I have shown certain present preferred embodiments of the invention in which FIGURE 1 is a side view, with portions removed affording a view to its interior, of a welding wire feed unit;

Figure 1:
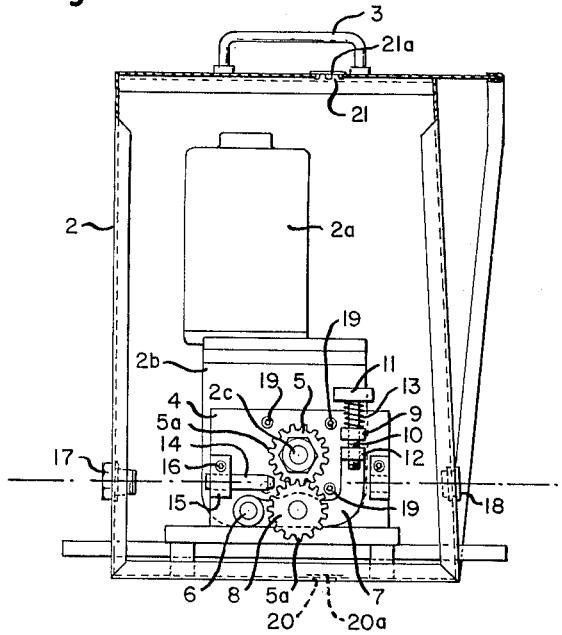
Figure 2:
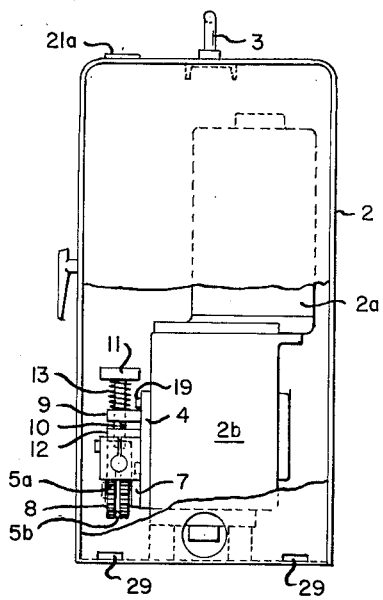
FIGURE 2 is an end view of the welding wire feed unit shown in FIGURE 1 with a portion cut away affording a partial view to the interior of the unit.

Referring now more particularly to the drawings, there is shown a portable welding apparatus having a welding wire feed unit comprising a mounting structure in the form of a casing 2 having a handle 3 adapting it to be carried suspended from the handle. Mounted in the casing 2 is a motor 2a driving through suitable gearing in a gear case 2b a shaft 2c to which is fixed a welding wire feed roll gear 5 having teeth 5a interrupted to provide a peripheral channel 5b to receive the welding wire to be fed. The shaft 2c extends through a block 4, the feed roll gear 5 being applied to the shaft 2c outside the block. Pivoted to the block 4 at 6 is an L-shaped lever 7 in which is rotatably mounted a second welding wire feed roll gear 8 which cooperates with the feed roll gear 5 to feed welding wire toward a welding zone. The welding wire feed roll gear 8 may be identical with the welding wire feed roll gear 5, having teeth 5a and a channel 5b. The teeth of the two feed roll gears mesh and the welding wire is gripped and fed in the cooperating channels 5b of the two feed roll gears. A bracket 9 is mounted on the block 4 and a screw 10 having an enlarged head 11 adapting it to be turned by hand passes freely through a bore through the bracket 9 and is threaded into a flange 12 at the extremity of the lever 7. A compression coil spring 13 is biased between the bracket 9 and the head 11 of the screw 10 and urges the roll 8 against the roll 5. The pressure with which the roll 8 is urged toward the roll 5 may be adjusted by turning the screw 10. A wire guide 14 is carried by the plate 4, being maintained in place by a strap 15 tightened about the wire guide 14 by a screw 16 threaded into the plate 4. The axis of the wire guide 14 is coincident with the throat between the rolls 5 and 8 formed by the cooperating channels 5b so that the wire guide guides a welding electrode or wire properly to the feed rolls which advance the electrode or wire toward the welding zone.

As will be seen in FIGURE 1, the casing 2 is provided in opposed generally upright walls with openings 17 and 18 which are in horizontal alignment with each other and also with the axis of the guide 14 and the throat formed between the rolls 5 and 8. Thus the rolls 5 and 8 feed wire entering the casing 2 through the opening 17 and passing through the guide 14 and between the rolls 5 and 8 and passing out of the casing 2 through the opening 18, the openings 17 and 18 serving as guide means for the wire.

The plate 4 is fastened in place in the casing 2 by four screws 19. The screws 19 are arranged in equidistant relationship as the corners of a square with the axis of the shaft 2c at the center of the square. The screws 19 pass through openings in the plate 4 and are threaded into correspondingly positioned threaded bores in the gear case 2b.

Figure 3:
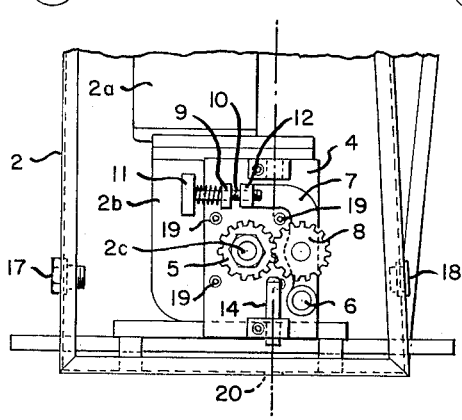
FIGURE 3 is a fragmentary view showing the lower portion of the welding wire feed unit shown in FIGURE 1 but with the wire feed roll gears arranged to feed welding wire vertically rather than horizontally as in FIGURE 1.

As the parts are arranged in FIGURE 1 welding wire is, as above indicated, fed from left to right through the openings 17 and 18 in the casing. It may be desired without changing the orientation of the casing to feed welding wire therethrough generally vertically, for example, upwardly through the bottom of the casing and out through the top. To this end the casing is provided with an opening 20 through its bottom and an aligned opening 21 through its top which may be closed by spring held caps 20a and 21a respectively when the openings 20 and 21 are not in use. The openings 20 and 21, like the openings 17 and 18, serve as guide means for the wire. To set up for feeding wire upwardly through the openings 20 and 21 the screws 19 are removed and the block 4 is rotated in the counterclockwise direction viewing FIGURE 1 through an angle of 90° about the axis of the shaft 2c to the position shown in FIGURE 3 whereupon the screws 19 are replaced. This can be done because the threaded bores or attaching portions in the gear case 2b are arranged in a square as are the openings or attaching portions in the plate 4 through which the screws or attaching means pass. When the plate 4 with the mechanism carried thereby as above explained is turned in the counterclockwise direction through an angle of 90° from the position of FIGURE 1 to the position of FIGURE 3 and fastened in place the axis of the guide 14 and the throat formed by the rolls 5 and 8 will extend vertically in alignment with the axes of the openings 20 and 21. Thus by the simple expedient of removing the screws 19 and turning the plate 4 through an angle of 90° the wire feed means may be disposed or adapted to feed welding wire through the casing toward a welding zone either horizontally or vertically as may be most convenient without altering the orientation of the casing.

Figure 4:
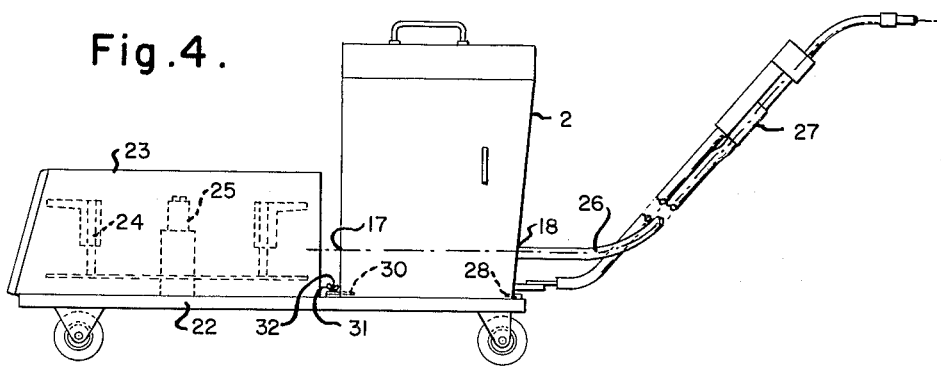
FIGURE 4 is a side view of a wheeled carrier having the welding wire feed unit and a reel of welding wire mounted thereon.

One of the primary advantages of my portable welding apparatus is its flexibility and adaptability of mounting. The wire feed unit is adapted to be mounted on a base in various different relationships to the work and to the source of welding wire. In FIGURE 4 the mounting structure or casing 2 is shown as being mounted on a wheeled carrier 22 upon which is also mounted in tandem with the mounting structure or casing 2 a wire supply unit 23 shown in this instance as comprising a reel 24 rotatably mounted upon a vertical spindle 25 delivering welding wire through the opening 17 into the casing and thence through the guide 14 and between the rolls 5 and 8 and out through the opening 18 into a tubular guide 26 and thence to the work. The tubular guide 26 may be combined with a handle structure 27 for moving the wheeled carrier 22.

The top surface of the wheeled carrier 22 constitutes a base upon which the mounting structure or casing 2 is disposed. The base has holddown means shown as being in the form of fingers 28 spaced slightly above the upper surface of the carrier 22 and extending laterally toward the casing 2, two such fingers being shown which are spaced apart widthwise of the wheeled carrier 22. The casing 2 has near its bottom openings 29 receiving the fingers 28 whereby to hold down to the base the side of the casing having the openings 29. At the opposite side of the casing, i.e., the side adjacent the wire supply unit 23, the casing is held down on the wheeled carrier 22 by removable clips 30 which may like the fingers 28 enter openings provided therefor in the casing and which may be held down on the wheeled carrier 22 by wing nuts 31 threaded onto studs 32 extending upwardly from the wheeled carrier through the slots in the clips 30. The casing 2 may be fastened in the manner described to a base in various relationships to the work and to the wire supply.

Figure 6:
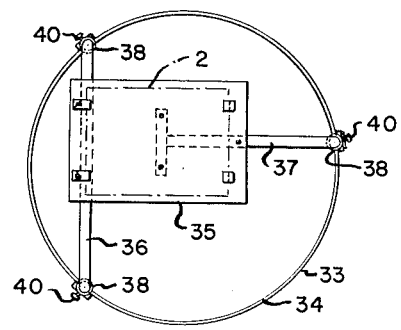
FIGURE 6 is a plan view of the structure of FIGURE 5.
Figure 5:
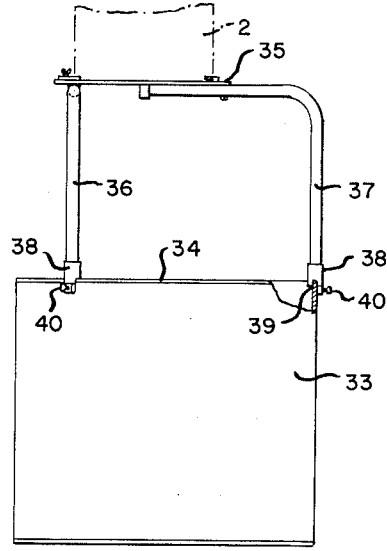
FIGURE 5 is a fragmentary elevational view with portions cut away showing mounting of the welding wire feed unit on a welding wire receptacle.

FIGURES 5 and 6 show a receptacle 33 for welding wire, the receptacle being cylindrical with its axis vertical and being open at the top and having a rim 34. The welding wire is arranged in coil form in the receptacle 33 with the axis of the coil vertical and is adapted to be withdrawn upwardly out of the receptacle as the welding progresses.

Mounted atop the receptacle 33 are supporting means for the mounting structure or casing 2, the supporting means being shown as comprising a base plate 35 to which the casing 2 is fastened in the same manner as above explained and shown in FIGURE 4 with respect to the wheeled carrier 22. The plate 35 is carried by two brackets 36 and 37. It may be fastened to the brackets in any suitable way as by welding, bolting, etc. The bracket 36 is of U shape with its legs extending downwardly while the bracket 37 is of L shape with one leg extending horizontally and the other leg extending downwardly from the horizontal leg. The plate 35 is carried by the horizontal leg at the top of the U shaped bracket 36 and the horizontal leg at the top of the L shaped bracket 37 as shown in FIGURES 5 and 6. The brackets are of tubular material, for example, pipe, and may have collars or coupling members 38 applied to their lower extremities as by threading. Each of the members 38 is upwardly slotted from its bottom as shown at 39 adapting the slot to fit over the rim of the receptacle 33. The members 38 may be turned to proper orientation to fit over the rim of the receptacle. Preferably the portion of each member 38 lying outside the receptacle is somewhat elongated relatively to the portion lying inside the receptacle and has a set screw 40 threaded therethrough to bear against the outer surface of the receptacle so that when the brackets 36 and 37 have been applied to the receptacle 33 they may be firmly fastened to the receptacle by tightening the set screws 40.

In the setup shown in FIGURES 5 and 6 the welding wire is fed generally vertically upwardly from the receptacle 33 through the opening 20 into the casing 2 and thence through the guide 14, between the rolls 5 and 8 and out through the opening 21 to a welding zone disposed generally above the casing. In this case the casing 2 is supported entirely on the receptacle 33.

Figure 8:
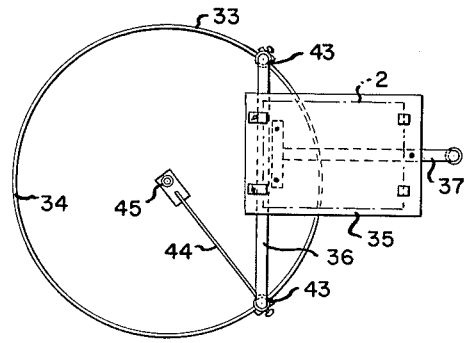
FIGURE 8 is a plan view of the structure of FIGURE 7.
Figure 7:
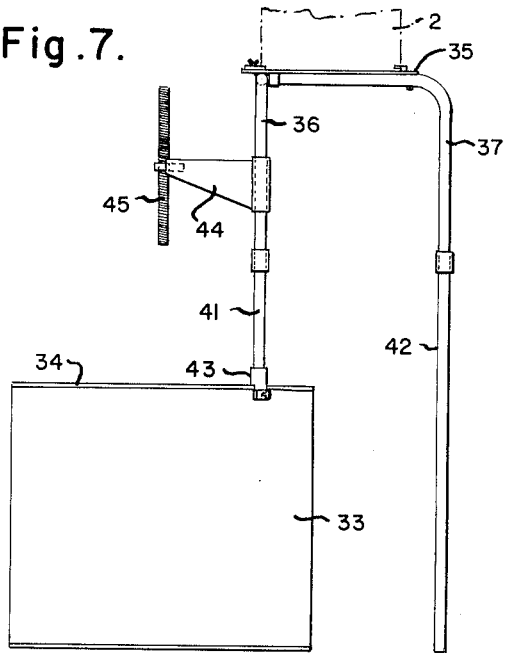
FIGURE 7 is a view similar to FIGURE 5 but showing mounting of the welding wire feed unit partially on the welding wire receptacle and partially separate therefrom.

In FIGURES 7 and 8 a modified mounting arrangement for the wire feed unit is shown. The plate 35 is mounted on the brackets 36 and 37 in the same manner as above described with respect to FIGURES 5 and 6 except that in this case the horizontal leg of the bracket 37 extends almost completely across the bottom of the casing 2 as shown. Lengths of tubular material 41 and 42 are coupled to the bottoms of the vertical legs of the brackets 36 and 37. At the bottom of the lengths 41 of tubular material are provided collars or coupling members 43 which may be identical with the members 38 and are applied to the rim of the receptacle 33 in analogous manner. The length 42 of tubular material which is coupled to the bottom of the vertical leg of the bracket 37 extends downwardly to the floor or whatever support carries the receptacle 33 as shown in FIGURES 7 and 8. Thus in this setup the casing 2 is supported in part on the receptacle 33 and in part independently of that receptacle.

In FIGURES 7 and 8 a lateral extension 44 is shown as applied to one of the vertical legs of the bracket 36, which extension carries a hollow flexible spring 45 serving as guide means for the welding wire as it is delivered generally upwardly out of the receptacle 33. The welding wire delivered upwardly out of the receptacle 33 passes through the guide 45 and turns laterally to enter the casing 2 through the opening 17 whence it passes through the guide 14, between the rolls 5 and 8 and out through the opening 18 to the welding zone. In the setup of FIGURES 7 and 8 the casing 2 is disposed generally above but laterally of the center of the receptacle to adapt it to feed wire delivered upwardly from the receptacle generally horizontally toward the welding zone.

Thus my portable welding apparatus has flexibility of mounting and use which extend its adaptability far beyond that of the portable welding apparatus of similar type heretofore available.

The circuitry of the portable welding apparatus may be conventional or unconventional, such, for example, as disclosed in copending application Serial No. 247,019, filed December 26, 1962. Subject matter disclosed but not claimed herein is claimed in my copending divisional application Serial No. 347,402, filed February 26, 1964, now Patent No. 3,162,750, dated December 22, 1964.

While I have shown and described certain present preferred embodiments of the invention it is to be distinctly understood that the invention is not limited thereto but may be otherwise variously embodied within the scope of the following claims.

I claim:

1. A portable welding apparatus comprising a mounting structure having a handle adapting it to be carried suspended from the handle, the mounting structure having first guide means defining a generally horizontal welding wire path through the mounting structure and second guide means defining a generally vertical welding wire path through the mounting structure, wire feed means adapted to be carried by the mounting structure but removable therefrom and attaching means for attaching the wire feed means to the mounting structure selectively in two predetermined positions in the mounting structure: (1) in position to feed wire in the generally horizontal path defined by said first guide means and (2) in position to feed wire in the generally vertical path defined by said second guide means.

2. A portable welding apparatus as claimed in claim 1 in which the generally horizontal and generally vertical wire paths intersect and the wire feed means are disposed in the plane defined by such intersecting paths in both of said positions.

3. A portable welding apparatus as claimed in claim 2 in which the attaching means attaching the wire feed means to the mounting structure engage the same portions of the mounting structure in both positions of the wire feed means.

4. A portable welding apparatus as claimed in claim 3 in which the wire feeds means and the mounting structure have cooperating attaching portions which register with each other in both positions of the wire feed means in the mounting structure.

5. A portable welding apparatus as claimed in claim 4 in which the attaching portions are holes receiving attaching means such as bolts.

6. A portable welding apparatus as claimed in claim 5 in which the holes are arranged as the apices of a plane figure having all sides equal and all included angles equal.

7. A portable welding apparatus comprising a casing having a handle adapting it to be carried suspended from the handle, a first pair of opposed openings in the sides of the casing through which welding wire is adapted to pass (into the casing at one side and out at the opposite side), a second pair of opposed openings in the top and bottom of the casing through which welding wire is adapted similarly to pass, wire feed means adapted to be carried by the casing but removable therefrom and attaching means for attaching the wire feed means to the casing selectively in two predetermined positions in the casing: (1) in position to feed wire passing through the first pair of opposed openings and (2) in position to feed wire passing through the second pair of opposed openings.

8. A portable welding apparatus as claimed in claim 7 in which the path of wire passing through the first pair of opposed openings and the path of wire passing through the second pair of opposed openings intersect in the casing and the wire feed means are disposed in the plane defined by such intersecting paths in both of said postiions.

9. A portable welding apparatus as claimed in claim 8 in which the attaching means attaching the wire feed means to the casing engage the same portions of the casing in both positions of the wire feed means.

10. A portable welding apparatus as claimed in claim 9 in which the wire feed means and the casing have cooperating attaching portions which register with each other in both positions of the wire feed means in the casing.

11. A portable welding apparatus as claimed in claim 10 in which the attaching portions are holes receiving attaching means such as bolts.

12. A portable welding apparatus as claimed in claim 11 in which the holes are arranged as the apices of a plane figure having all sides equal and all included angles equal.

13. A portable welding apparatus comprising a base, a mounting structure having wire feed means therein, the mounting structure being disposed on the base, the base having holddown means, the mounting structure having at one side a generally upright casing portion having an opening therethrough receiving the holddown means whereby to hold down to the base that side of the mounting structure, and means at the opposite side of the mounting structure fastening such opposite side of the mounting structure to the base whereby to connect the mounting structure to the base.

14. A portable welding apparatus comprising a base, a mounting structure having wire fed means therein, the mounting structure being disposed on the base, the base having a holddown finger extending upwardly and laterally therefrom, the mounting structure having at one side a generally upright casing portion having an opening therethrough receiving the laterally projecting portion of the holddown finger whereby to hold down to the base that side of the mounting structure, and removable means at the opposite side of the mounting structure fastening such opposite side of the mounting structure to the base whereby to connect the mounting structure to the base.

References Cited by the Examiner
UNITED STATES PATENTS

| | | | |
|---|---|---|---|
| 2,066,163 | 12/36 | Stephens et al. | 314—69 |
| 2,583,586 | 1/52 | Miller | 248—361 X |
| 2,833,912 | 5/58 | Rayer | 219—130 |
| 2,880,305 | 3/59 | Baird | 219—130 |
| 2,912,612 | 11/59 | Brady et al. | 314—72 |

FOREIGN PATENTS 218,467 11/58 Australia.

RICHARD M. WOOD, *Primary Examiner.*

UNITED STATES PATENT OFFICE
CERTIFICATE OF CORRECTION

Patent No. 3,217,136                                          November 9, 1965

Hubert J. Anderson

It is hereby certified that error appears in the above numbered patent requiring correction and that the said Letters Patent should read as corrected below.

Column 6, line 47, for "feeds" read -- feed --; column 7, line 4, for "postiions" read -- positions --; column 8, line 4, for "fed" read -- feed --.

Signed and sealed this 27th day of September 1966.

(SEAL)
Attest:

ERNEST W. SWIDER                                         EDWARD J. BRENNER
Attesting Officer                                              Commissioner of Patents